United States Patent
Aaltonen (10) Patent No.: US 7,801,165 B2
(45) Date of Patent: Sep. 21, 2010

(54) MULTICAST DATA TRANSFER

(75) Inventor: Janne Aaltonen, Turku (FI)

(73) Assignee: Nokia Corporation, Espoo (FI)

( * ) Notice: Subject to any disclaimer, the term of this patent is extended or adjusted under 35 U.S.C. 154(b) by 692 days.

(21) Appl. No.: 10/531,101

(22) PCT Filed: Sep. 24, 2003

(86) PCT No.: PCT/IB03/04309

§ 371 (c)(1),
(2), (4) Date: Apr. 11, 2005

(87) PCT Pub. No.: WO2004/036827

PCT Pub. Date: Apr. 29, 2004

(65) Prior Publication Data

US 2006/0034313 A1    Feb. 16, 2006

(30) Foreign Application Priority Data

Oct. 16, 2002    (GB) .................................. 0224076.0

(51) Int. Cl.
*H04J 3/26* (2006.01)
(52) U.S. Cl. .................. 370/432; 370/236; 370/338; 370/408; 714/748; 709/244; 709/245
(58) Field of Classification Search .............. 370/432, 370/236, 338, 408; 455/419; 709/244, 245; 714/748, 749
See application file for complete search history.

(56) References Cited

U.S. PATENT DOCUMENTS

| | | | |
|---|---|---|---|
| 5,727,002 A * | 3/1998 | Miller et al. ................. | 714/748 |
| 5,805,825 A | 9/1998 | Danneels et al. | |
| 5,905,871 A | 5/1999 | Buskens et al. | |
| 6,151,696 A * | 11/2000 | Miller et al. ................. | 714/748 |
| 6,154,463 A | 11/2000 | Paul et al. | |
| 6,163,810 A * | 12/2000 | Bhagavath et al. .......... | 709/238 |
| 6,208,647 B1 * | 3/2001 | Deng et al. ................. | 370/390 |
| 6,269,080 B1 | 7/2001 | Kumar | |
| 6,453,438 B1 * | 9/2002 | Miller et al. ................. | 714/749 |
| 6,515,994 B1 | 2/2003 | Chuah et al. | |
| 6,539,022 B1 * | 3/2003 | Virgile ....................... | 370/401 |
| 6,917,985 B2 * | 7/2005 | Madruga et al. ............ | 709/238 |
| 6,963,972 B1 * | 11/2005 | Chang et al. ................ | 713/153 |
| 6,970,698 B2 * | 11/2005 | Majmundar et al. ......... | 455/419 |
| 2002/0105926 A1 * | 8/2002 | Famolari et al. ............ | 370/331 |
| 2002/0114302 A1 * | 8/2002 | McDonald et al. .......... | 370/338 |
| 2002/0174366 A1 * | 11/2002 | Peterka et al. .............. | 713/201 |
| 2006/0154603 A1 * | 7/2006 | Sachs et al. ................. | 455/39 |

FOREIGN PATENT DOCUMENTS

| | | |
|---|---|---|
| EP | 0959635 A1 | 11/1999 |
| WO | WO 00 01115 A | 1/2000 |
| WO | WO 03 090398 A | 10/2003 |

* cited by examiner

*Primary Examiner*—Ricky Ngo
*Assistant Examiner*—Luat Phung
(74) *Attorney, Agent, or Firm*—Banner & Witcoff Ltd.

(57) ABSTRACT

In response to a file request from a host 3a, a server 7 retrieves the file from a content provider 2. A group comprising the host 3a is defined and the file sent to the group as a sequence of data packets A-G. Any further hosts 3b, 3c in the same locational area as host 3a that submit a request for the same file during the transmission of the data packet sequence are added to the group and receive the remaining packets in the sequence. At the end of the sequence, the server 7 re-transmits the data packet sequence to hosts 3b, 3c so that they receive the data packets dropped or missed in the original transmission. A host 3b that moves to another location during the transmission submits a NACK message, which is treated by a server 7' associated with the second locational area as a file request.

18 Claims, 5 Drawing Sheets

MULTICAST DATA TRANSFER

FIELD OF THE INVENTION

The invention relates to the simultaneous delivery of information to multiple hosts. In particular, the invention relates to an apparatus and method for transferring text, audio, video or other data to multiple hosts in a communication system.

BACKGROUND

Methods for transmitting data from a source to multiple users over a network fall into one of three categories. Unicast is a point-to-point delivery mechanism, where a source transmits a separate stream of data for each user. The volume of data transmitted increases linearly with the number of users, leading to the consumption of an unacceptably high level of resources where the number of recipients is large. The remaining two categories define point-to-multipoint or multipoint-to-multipoint delivery mechanisms. Broadcasting refers to the transmission of data to all hosts on a network. While this may work well in small networks, it requires the replication of a large number of data packets when used in a wide area network with many users. Furthermore, this method can be wasteful where the data is not of interest to a significant proportion of the recipients.

The third category is multicasting, which is the simultaneous transmission of data to a select group of users. Multicasting has particular application in fields requiring streaming of content to multiple users in real time, such as news feeds, online gaming, Digital Video Broadcasting (DVB) and videoconferencing. Overviews of this technique are given in "Multicast Networking and Application" by C. Kenneth Miller, Addison-Wesley 1988 [ISBN 0-201-30979-3] and in "Deploying IP MULTICAST in the Enterprise" by T. Maufer, Prentice Hall PTR, 1998 [ISBN 0-13-897687-2]. The use of multicasting in a cellular radio access network is discussed in "Multimedia Broadcast/Multicast Service", $3^{rd}$ Generation Partnership Project Technical Specification 3GPP™ TS 22.146 v1.0.0 2001.

Figure 1:
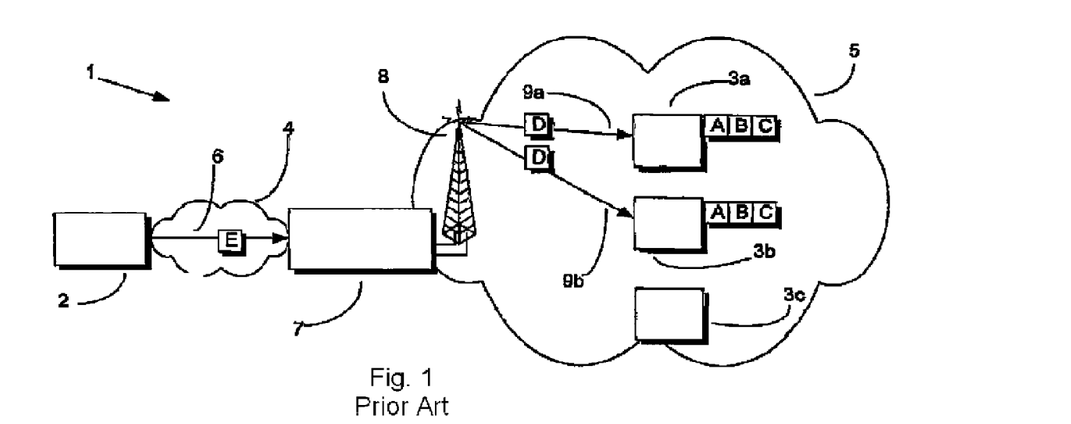
FIG. 1 is a block diagram of a prior art communication system.

FIG. 1 is a block diagram of a prior communication system 1, for multicasting information from a content provider, i.e., host 2, to a plurality of receiver hosts 3 via a first network 4, such as the Internet, and a radio access network 5. For simplicity, a data path 6 through the Internet 4 is depicted as extending directly from the content provider 2 to a router 7 without intervening stages, such as other transmitters, routers or servers, which may be located between these nodes. Data paths leading from the content provider 2 to the receiver hosts 3a-3c diverge at the router 7. Situations where this divergence occurs include those where the receiver hosts 3 do not belong to the same sub-network, where the receiver hosts 3 are served by different transmitters 8 or where the radio access network 5 is not multicast enabled.

Instead of sending a separate stream of data packets A-D for each individual receiver host 3a, 3b, the content provider 2 provides a single data stream 6, which is transmitted over the Internet 4 to the point at which the paths to the individual receiver hosts 3a, 3b diverge, which in this example comprises the router 7. At this point, the data stream of packets is replicated for onward transmission to the receiver hosts 3a, 3b individually, the router 7 being multicast-enabled in order to carry out the replication of the data. It will be understood that other routers (not shown) in the network are also multicast enabled so that the data can be multicast to other receiver hosts individually. Thus, the router 7 copies incoming data packets A-E, producing duplicate data streams 9a, 9b for transmission to the receiver hosts 3a, 3b. As the content provider 2 transmits only a single data stream 6, the use of its system resources and the network load are reduced when compared with a unicast system. Furthermore, as the transmission of replicated data is kept to a minimum, multicasting may be used in wide area networks where broadcasting is unfeasible.

There are two types of multicasting services. In the first, a content provider has a reserved bandwidth for delivering a predetermined service to a group of end-users. The second type allows end-users to select the service provided to them. In both cases, a user can receive the multicast stream of data by submitting a request to join the group by sending a message to the content provider in a format specified by the Internet Engineering Task Force (IETF). The user can leave the multicast group by submitting a corresponding request.

Multicasting is a suitable mechanism for providing end-users with a continuous service but has limited applicability for "one-shot" transmissions. For example, a group of users may require the delivery of a file, for example, a multimedia clip, a web page, an mp3 file, a document or a software module for an application or a game. Referring again to FIG. 1, the users of receiver hosts 3a, 3b may both request the file, which comprises data packets A-E, from the content provider 2. As the data stream 6 is received by the router 7, the data packets are copied and forwarded to a radio transmitter 8, which transmits the encapsulated data packets to receiver hosts 3a, 3b as data streams 9a, 9b over a wireless network.

However, there are currently no provisions for allowing a host to join an ongoing file delivery transmission, so a third host 3c, requesting a file after the start of the transmission, would be excluded from the multicast file delivery transmission. Even if the third host 3c were to join the file delivery transmission, data packets A-C would have been missed and it is probable that the user of host 3c would require the entire file. This exclusion increases the likelihood that a transmission is received by a low number of recipients, or even a single user. Requests submitted after the delivery of the data packets A-E has commenced are accommodated by repeating the file delivery transmission.

Prior systems have addressed this problem by defining a schedule of forthcoming transmissions. A user can subscribe to a delivery list for a particular file, or set of files, and receive the relevant data at the next scheduled opportunity. However, this delivery mechanism does not respond directly to the user's requirements and is inflexible as, again, once the file delivery transmission has begun, any other further users requiring the same file are excluded and must subscribe to the next scheduled transmission.

In addition, a host 3b may drop one or more packets or, having received the first data packets A-C, become unable to receive the remaining packets D, E in a file delivery transmission. The host 3b cannot make use of the data packets it has received and, in order to receive the entire file, data packets A-E, must wait for file delivery transmission, which may necessitate joining another multicast group.

The problems associated with "one-shot" transmissions are exacerbated in systems for multicasting data to mobile devices. In particular, a mobile device receiving the data packets over a cellular communications network may be located in a first cell when joining the group and move into a different cell during the file delivery transmission. The mobile device cannot receive the remaining data packets in the file delivery transmission as the mobile device is no longer in the first cell.

The repetition of file delivery transmissions in order to accommodate further hosts and missed or dropped packets reduces the efficiency gain associated with multicasting and increases the load on the air interface bandwidth. As use of the air interface for the provision of Internet type services rises, the efficient use of air interface bandwidth will become an increasingly important consideration.

SUMMARY OF THE INVENTION

An object of the invention is to provide multicast file delivery in a manner that is more responsive to users' needs, with particular application to scalable multicasts such as unidirectional IP multicasts. The invention has particular advantages in systems for transferring data to mobile devices comprising a cellular telecommunications network where a user may move between cells during the course of data transmission. Another object of the invention is to provide efficient use of the air interface bandwidth.

According to a first aspect of the invention, a multicast-enabled network element comprises a first logical interface for receiving a file from a content provider, a second logical interface for forwarding said file to one or more hosts as a sequence of data packets in a file delivery transmission and a processor for defining a group of one or more hosts, wherein further hosts may be added to the group in response to the reception of a request from said further host, the group being limited to further hosts situated within a single locational area, wherein said server is configured to transmit the file to the group so that said further hosts joining the group during transmission of the data packet sequence receive the remaining data packets in said sequence.

According to a second aspect of the invention, a method of file delivery over a network comprises the steps of receiving at a network element a request for the file from a first host, retrieving the file from a content provider, defining a group comprising the first host, forwarding the file to the group as a sequence of data packets in a file delivery transmission and adding to the group any further hosts submitting requests for the file during said file delivery transmission so that said further hosts receive the remaining data packets in said file delivery transmission, wherein the group is limited to further receiver hosts with a same locational area as the first host.

This aspect further provides a computer program comprising program instructions for causing a network element to perform the method.

According to a third aspect of the invention, a method of file retrieval by a host over a network comprises the steps of sending a request to join a group to a network element, receiving a start packet transmitted by the network element which configures the connection between the network element and host, receiving a sequence of data packets transmitted by the network element in a first file delivery transmission, arranging the sequence of data packets in their appropriate order and receiving a second file delivery transmission comprising the sequence of data packets, wherein the host retrieves any data packets that were dropped or missed in the first file delivery transmission by retrieving the corresponding data packets in the second file delivery transmission.

The invention allows a user to join a group, receive the remaining data packets in an ongoing file transmission and receive any missed data packets in the subsequent file transmission. Therefore, the time period between the submission of a file request from a host and the completion of the file delivery is approximately the same for all hosts, although there will be small delays caused by the server sending additional packets for configuring connections. This compares favourably with the time period experienced in prior queuing systems, where the a host would have to wait until a previous file delivery transmission has been completed, leading to improved data transmission rates and a quality of service that can be guaranteed.

Furthermore, the ability to join ongoing transmissions and receive the remaining data packets in a sequence assists in efficient delivery of a file where data packets have been missed or dropped, or where the file delivery path to a receiver host changes during the transmission.

BRIEF DESCRIPTION OF THE DRAWINGS

An embodiment of the invention will now be described with reference to the accompanying drawings, in which.

DETAILED DESCRIPTION

Figure 2:
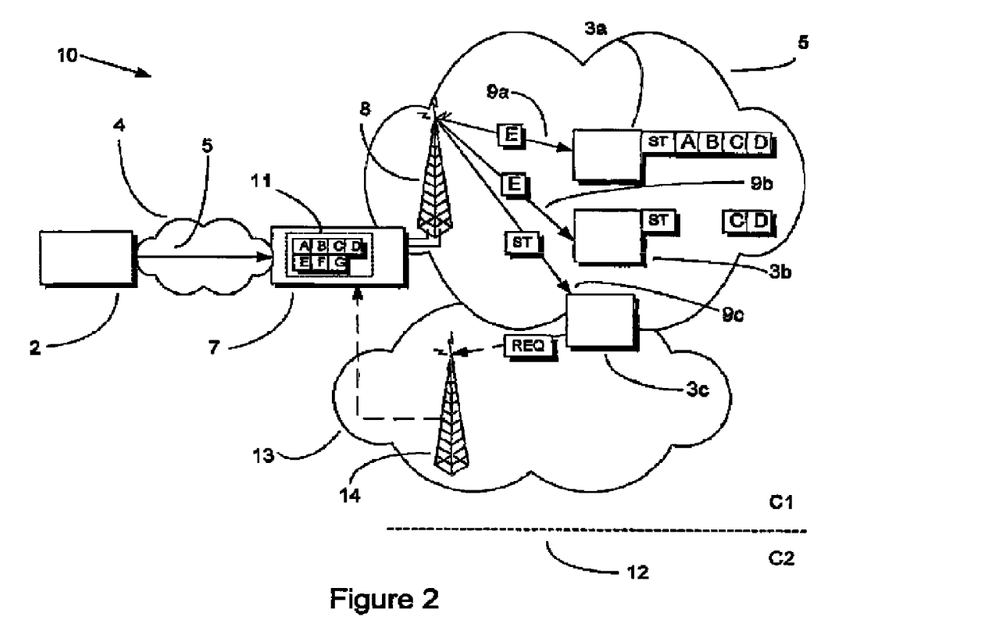
FIG. 2 is a block diagram of a communication system in accordance with an embodiment of the present invention at a first stage in a file delivery process.

FIG. 2 depicts an embodiment of a communication system 10 for multicast file delivery comprising a multimedia content provider 2, receiver hosts 3a-3c, a server 7, which includes means for performing the functions of a router, a radio transmitter 8 and a cache 11. The data paths leading from the content provider 2 to the receiver hosts 3a-3c have a common portion 6 extending between the content provider 2 and the server 7 over the Internet 4 and diverge at the server 7, which is the last network element in the data paths to the individual receiver hosts 3a-3c before an air interface. The data path 6 may include further elements, such as other transmitters, routers or servers, which may be located between the content provider 2 and server 7.

In this particular example, receiver hosts 3a-3c are mobile devices belonging to a cellular wireless DVB-T wide area network (WAN) 5. In FIG. 2, the three receiver hosts 3a-3c are situated in an area covered by a single DVB-T cell C1, which is defined by a cell boundary 12 and associated with the transmitter 8. The area covered by the DVB-T cell C1 is used to define the location of the receiver hosts 3, so that, in this example, the receiver hosts 3a-3c have a common location. The server 7 forwards the multicast data to the radio transmitter 8, which sends the data to the receiver hosts over the DVB-T network 5 in accordance with a suitable communication protocol. Suitable protocols include, but are not limited to, the following protocols: Reliable Multicast Transport Protocol (RMTP), Reliable Multicast File Transfer Protocol (RMFTP), Asynchronous Layered Coding (ALC), NACK-Oriented Reliable Multicast (NORM), Pragmatic General Multicast (PGM), Tree Acknowledgement based protocol (TRACK), User Datagram Protocol (UDP) and Unidirectional Hypertext Transfer Protocol (UHTTP). The Session Announcement Protocol (SAP) may also be used for sending service information to the receiver hosts 3a-3c.

In this example, where the DVB-T network 5 is used for unidirectional communication only, communications between the receiver host 3a and the server 7, including file requests (REQ), are made via an alternative communication system, such as a cellular telecommunications network 13. In the figures, the transmission of file data over the Internet 4 or DVB-T network 5 is indicated using solid lines, while communication over the telecommunications network 13 is shown with dashed lines. It is possible that, while belonging to a single DVB-T cell C1, the receiver hosts 3a-3c may belong to different cells in the telecommunications network 13, or even to separate telecommunications networks, however, for simplicity, only a single telecommunications network 13 and associated transmitter 14 are depicted in the figures.

Figure 3:
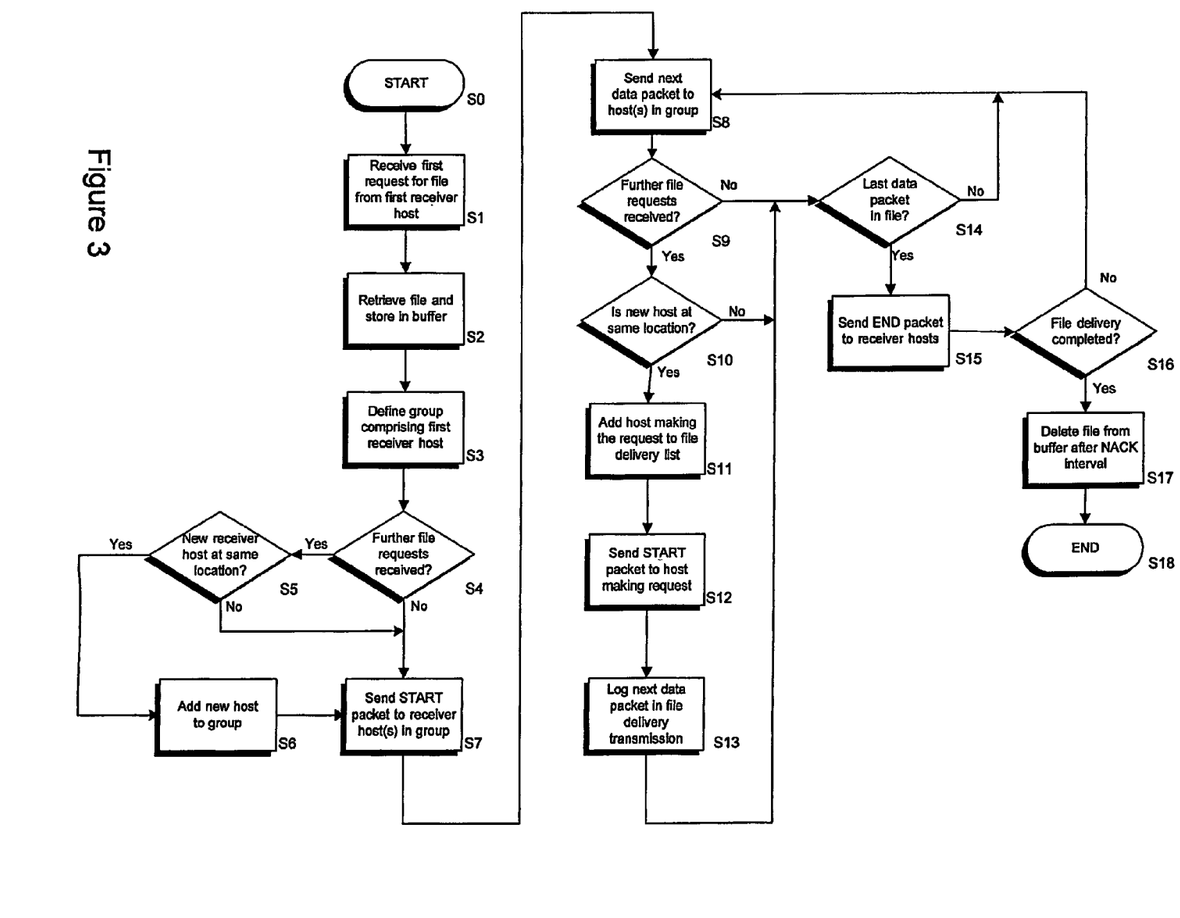
FIG. 3 is a flowchart of a multicasting process according to an embodiment of the present invention, as enacted by a server.

An embodiment of the file delivery procedure followed by the server 7 is described with reference to FIG. 3. Beginning at step s0, the server 7 receives a request for a file, such as a multimedia clip, or a popular song in mp3 format, from a receiver host 3a (step s1) via the telecommunications network 13. The request from receiver host 3a includes information about its location, in terms of the DVB-T cell C1 in which the receiver host 3a is located.

The server 7 requests the file from the content provider 2 (step s2), which responds by transmitting the file to the server 7, together with an associated delivery message. The delivery message includes information about the time the file was created and an indication of when it will next be updated. The file and delivery message are stored in the cache 11.

The server 7 defines a group and sets up a corresponding file delivery list with entries that indicate receiver hosts 3 which have requested the file and are situated within that locational area, i.e. within an area covered by the same DVB-T cell C1 (step s3). At this stage, the list contains only one entry, relating to receiver host 3a, although if a request for the same file is received from another receiver host (step s4) during retrieval of the file, the server 7 would check whether the new receiver host is located within the same DVB-T cell C1 as the first receiver host 3a (step s5). If so, the new receiver host is added to the group at this stage by adding a corresponding entry to the file delivery list (step s6). If the new receiver host is at a second location, e.g. a second DVB-T cell C2, the server 7 may set up a separate file delivery list for that location or, where a file delivery list for the second location C2 already exists, add the new receiver host to the relevant list.

The server 7 sends a "start" packet ST to the first receiver host 3a via the radio transmitter 8 (step s7). The start packet ST is also sent to any other receiver host currently in the group. The start packet ST is associated with an application that carries out the "handshake" procedure for establishing a connection between the server 7 and receiver host 3a.

Some communication protocols, e.g. NORM or PGM, require a receiver host 3a to send a negative acknowledgement (NACK) to the server 7 where a data packet has not been received or where a corrupted data packet has been received. A negative acknowledgement is a message requesting the retransmission of one or more missed data packets. Where the invention is applied in a system using such a protocol, the connection between the server 7 and receiver host 3a is configured so that a period of time is allowed by the receiver host 3a before a negative acknowledgement message or status report is sent to the server 7. This period of time is longer than the time taken to receive the entire file. The reasons for this will be described later.

The file is then retrieved from the cache 11 and arranged into data packets A-G according to the appropriate communication protocol. The header information included in the data packets A-G includes information regarding its position in the order of the data packets within the file. The server 7 begins to forward copies of the data packets in sequence to the radio transmitter 8, where they are encapsulated in an IP datagram and sent to the group (step s8). In this example, the group contains only the first receiver host 3a at this stage.

Unlike the prior system, the present multicast system allows further receiver hosts 3 to join the ongoing file delivery transmission. For example, if a file request from a second receiver host 3b is received (step s9) while the file delivery transmission to receiver host 3a is in progress, e.g., after data packets A, B have been sent to the first receiver host 3a, the server 7 responds by checking whether the second receiver host 3b is at the same location as the first receiver host 3a, i.e. whether receiver host 3b is located in the area covered by DVB-T cell C1 (step s10). If so, the second receiver host 3b is added to the group (step s11) and a start packet ST is sent to the second receiver host 3b in order to establish a connection (step s12). The server 7 makes an entry in the file delivery list logging the next data packet A-G to be transmitted (step s13). This information is used to determine the point in the data packet sequence at which the second receiver host 3b joined the group. Subsequent data packets C-G are copied to the receiver hosts 3a, 3b in the group (step s8). As the data packet headers indicate their position in the data packet sequence, the second receiver host 3b, having missed the initial packets A, B can arrange the incoming data packets C-G in the appropriate order in its IP stack.

Similarly, if a request is received from a third receiver host 3c within the same DVB-T cell C1 after data packets A-D have been transmitted, the server 7 will send a start packet ST to the third receiver host 3c and add the third receiver host 3c to the group by including a corresponding entry to the file delivery list. Thus, the third receiver host 3c will receive data packets E-G during the ongoing file transmission.

When the last data packet in the file has been sent (step s14), the server 7 sends an "end" packet END to the receiver hosts 3a, 3b in the group (step s15), which indicates that the end of the data packet sequence has been reached. The server 7 then checks whether the delivery of the file to each of the hosts 3a-3c has been completed (step s16). For example, the log associated with the file delivery list may be checked, so that the various points in the data packet sequence where the receiver hosts 3a-3c joined the file delivery transmission can be used to determine whether any of the hosts 3a-3c require further data packets (step s16). Alternatively, the connection between the server 7 and each receiver host 3a-3c may be configured so that it is terminated by either the server 7 or the receiver host 3a-3c and/or the server 7 may remove the entry corresponding to that receiver host 3 from the file delivery list when the complete sequence of data packets A-G has been received. However, it may not be necessary to terminate the connection between the server 7 and receiver host 3a when the file delivery to that receiver host 3a has been completed, as it is common practice to configure the receiver hosts 3 to drop any duplicate packets it receives.

Figure 4:
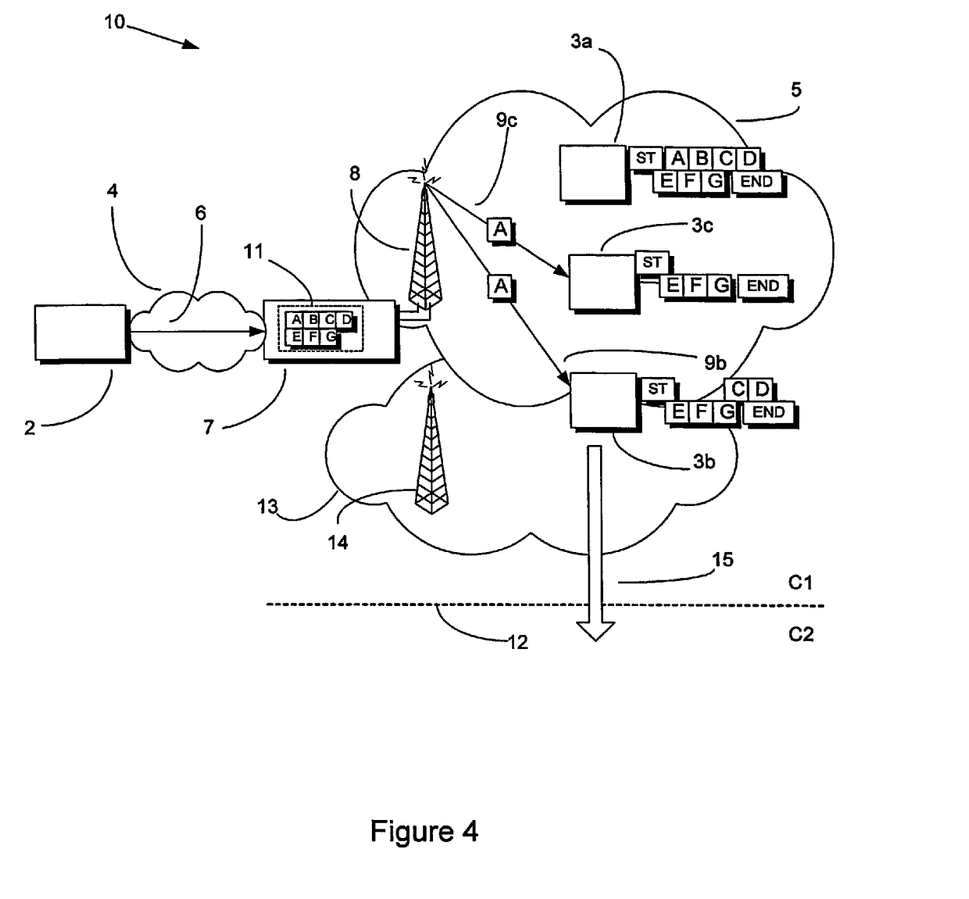
FIG. 4 is a block diagram of part of the communication system shown in FIG. 2 at a second stage in the file delivery process.

The server 7 then allows a period of time for the receipt of requests for missing packets from receiver hosts 3 that have not received the full sequence of data packets A-G. For example, in the situation shown in FIG. 4, the first receiver host 3a has received the complete sequence of data packets A-G, while the second and third receiver hosts 3b, 3c have received only part of the data packet sequence C-G and F-G respectively along with the start and end packets, ST, END. If one or more receiver hosts 3b, 3c have not received the complete file, the server 7 continues to transmit the data packets A-G (step s8), beginning at the start of the data packet sequence. As described above, the receiver hosts 3b, 3c use the information in the data packet header regarding the position of the incoming data packet in the sequence to assemble the data packets in the correct order.

Furthermore, a receiver host 3 that did not receive a packet for any other reason, e.g., such as a problem with its connection to the server 7, can use the data packets sent in the retransmission of the file to complete the data packet sequence in its IP stack. For example, if receiver host 3b has received packet C, E-G but had dropped packet D, the receiver host 3b can retrieve both the missing packets A, B and the dropped packet D from a subsequent file retransmission before the expiry of the time period allowed by the receiver host 3b before sending a negative acknowledgement. The use of data packets from subsequent file retransmissions reduces the number of negative acknowledgements and resulting retransmissions of data packets to individual receiver hosts 3, thereby lessening network traffic. However, the negative acknowledgement procedure would be used where a receiver host 3 has lost a packet in the final file transmission in the file delivery process due to transmission failure or corruption. In this particular case the receiver host 3a would send a negative acknowledgement message to the server 7 via the cellular telecommunications network 13 requesting retransmission of the missing packets on the expiry of the time period.

Any negative acknowledgements that are sent by one of the receiver hosts, e.g. host 3c, are multicasted via the server 7 and radio transmitter 8 to the other receiver hosts 3a, 3b. This avoids the sending of multiple negative acknowledgements by the receiver hosts in relation to the same data packet.

Figure 5:
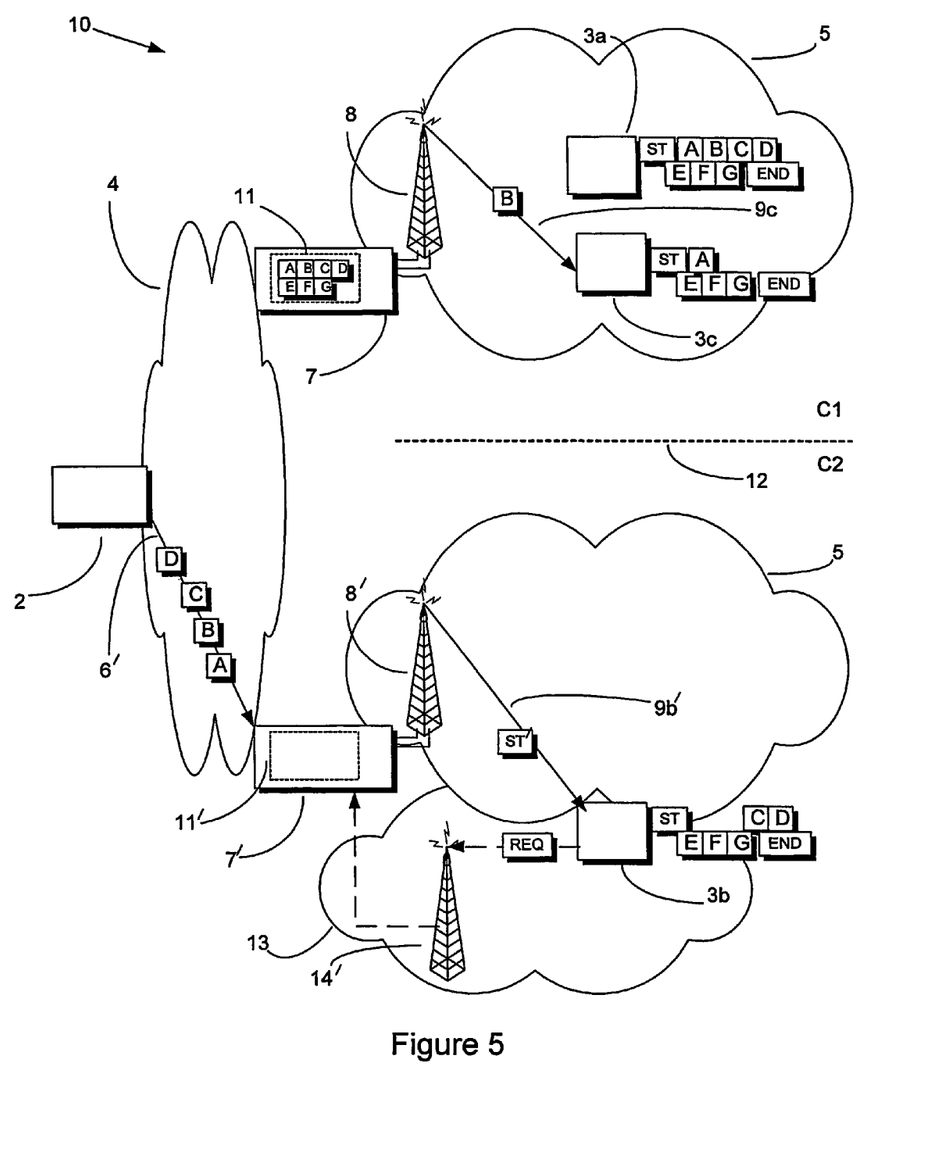
FIG. 5 is a block diagram of part of the communication system shown in FIG. 2 at a third stage in the file delivery process.

A receiver host 3 may also miss data packets due to its movement out of the locational area associated with the group, i.e. out of the DVB-T cell C1 used to define the group location. For example, during the retransmission of data packet A shown in FIG. 4, receiver host 3b may move over the cell boundary 12, in the direction of arrow 15, to another DVB-T cell C2, as shown in FIG. 5. While the server 7 will continue the file delivery transmission, transmitting data packets to receiver host 3c, receiver host 3b can no longer receive data stream 9b. After the expiry of the allowed time period, the receiver host 3b will send one or more negative acknowledgement messages relating to data packets A, B via communications system 13, which include information regarding its new location. This will be received at a server 7' associated with the new DVB-T cell C2, which treats the NACK as a request for the file. The server 7' then follows the procedure of FIG. 3, by requesting the file from the content provider 2, receiving the file via the Internet 4 over data path 6', storing it in a cache 11', setting up a group associated with the location C2 of the receiver host 3b and transmitting the file via transmitter 8' as data stream 9b'. However, if there is an ongoing file delivery transmission for the same file at the new DVB-T cell C2, the server 7' will add the receiver host 3b to that group. The server 7 associated with the original DVB-T cell C1 could then delete the receiver host 3b from its group as, in the absence of any negative acknowledgement messages, the file delivery to receiver host 3b would be considered complete, as described above in relation to step s16. The servers 7, 7', transmitters 8, 8' and caches 11, 11' may be physically provided as a single server 7, transmitter 8 and cache 11 configured to serve both cells C1, C2.

Once the file delivery has been completed, the file in cache 11 is deleted (step s17), completing the file delivery process (step s18). Alternatively, the deletion of the file in the cache 11 may be delayed for a predetermined period of time after the completion of file delivery, in order to meet any further requests for the file without repeating the step of retrieving the file from the content provider 2 (step s2). Under this mode of operation, after receiving a request for the file, the server 7 checks whether a copy of the file is already stored in its cache 11 and uses the information in the delivery message to determine whether the file in cache 11 is the latest available version and whether it is necessary to retrieve an updated file from the content provider 2. This procedure may also be followed by the second server 7' mentioned above.

Figure 6:
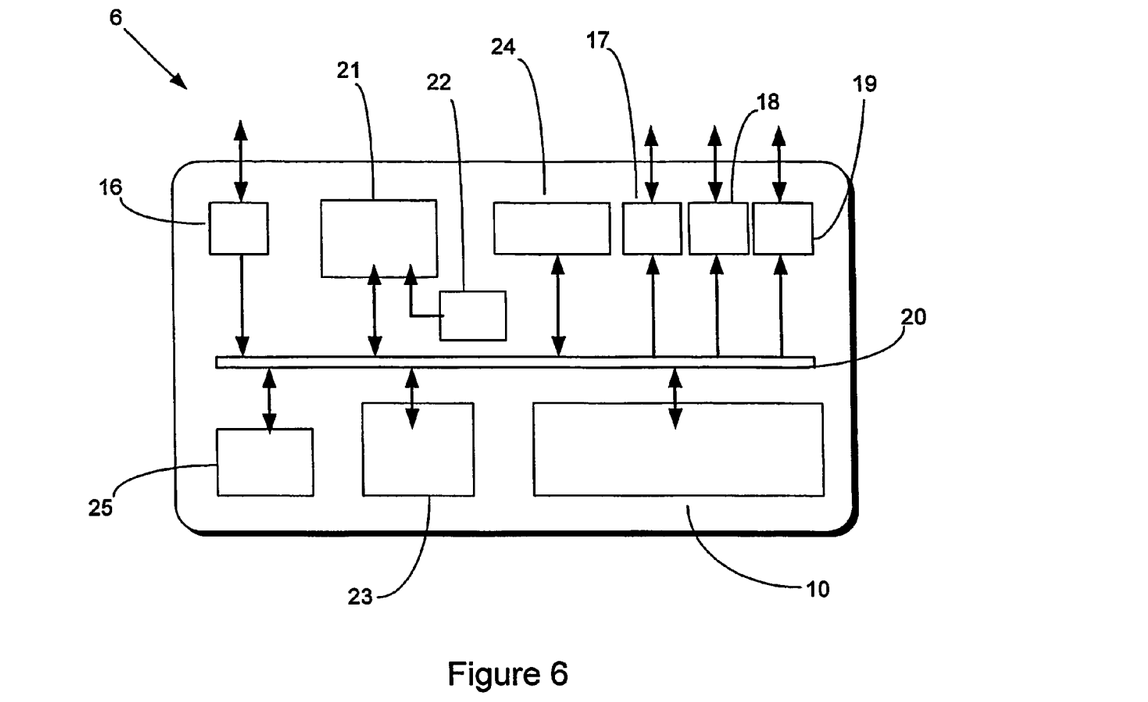
FIG. 6 is a block diagram of a server in accordance with an embodiment of the present invention.

An example of a suitable server 7 is shown in detail in FIG. 6. In addition to the cache 11, the server 7 comprises an input/output interface 16 for receiving data from the content provider 2 and input/output interfaces 17-19 for forwarding data to the receiver hosts 3a-3c. The file requests are received via the input/output interface 16, where file requests are submitted via a telecommunications network 13, as in the figures, or via the Internet 4. Alternatively, where the wireless network 5 is used for bi-directional communication, the file requests may be received at interfaces 17-19. The interfaces 16-19 and a number of other components are connected by a data bus 20 as follows. A processor 21, with an associated clock 22, monitors and controls routing operations, including generating processes for establishing and releasing connections between the server 7 and receiver hosts 3a-3c. A storage device 23 is provided for storing the server application software. An address processor 24 extracts the address information from incoming data packets and uses this information to determine how each data packet is to be processed, e.g., whether an incoming packet is a request for a file from a receiver host 3a-3c or file data. Incoming file data is stored in the cache 11, although the server may also have access to an external buffer for storing large files. File requests are forwarded to a file request handler 25, which manages the copying of data packets A-G for transmission to the receiver hosts 3a-3c and the encryption of information relating to the correct order of the data packets A-G in the packet headers. The file request handler 25 also maintains the file delivery list.

Figure 7:
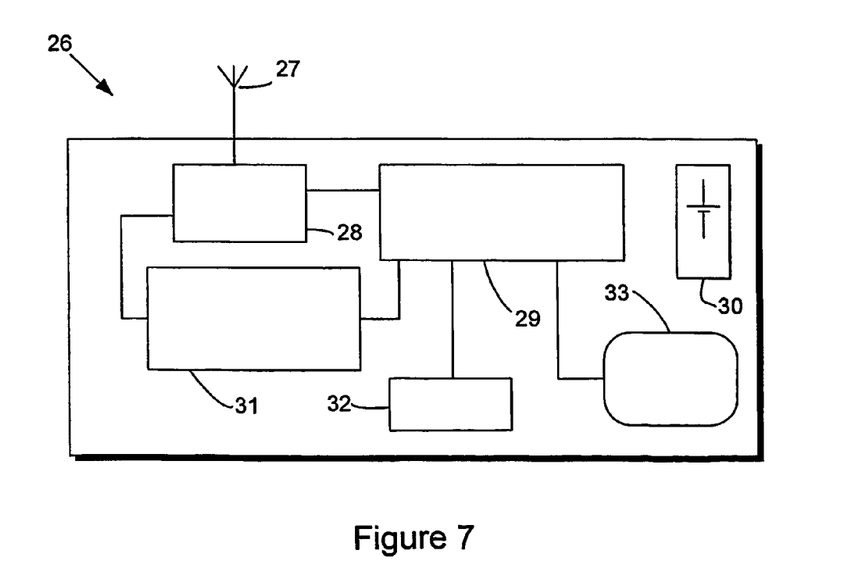
FIG. 7 depicts a mobile handset terminal for use according to an embodiment of the invention.

The receiver hosts 3 may be mobile telephone handset terminals, such as that shown in FIG. 7. The mobile telephone handset terminal 26 comprises an antenna 27, a transceiver 28, a central processing unit (CPU) 29 and a battery 30. The transceiver 28, which is, for example, a GSM, GPRS, 3G, or similar bi-directional transceiver, is connected to the antenna 27 and the CPU 29. Also connected to the CPU 29 are a receiver (DVB-T) 31, a keypad 32 and a display 33. The terminal 26 also includes other conventional features of mobile telephone handsets, but these are omitted from FIG. 7 for the sake of clarity.

The time interval between the submission of a file request by a receiver host and the receipt of the full sequence of data packets A-G should be the same for each of the receiver hosts 3a-3c, allowing for small differences due to the transmission of further start packets ST to other receiver hosts 3. This predictability allows a service provider to guarantee the quality of service in terms of data transmission rates. This time interval compares favourably with a unicast system, or the prior multicast system where the available window for further receiver hosts 3b, 3c to join an ongoing file delivery transmission is small. This provides potential efficiency gains as the likelihood that a data packet A in a file delivery transmission is sent to a single receiver host is decreased, which reduces the number of file delivery transmissions needed to accommodate a given number of receiver hosts 3.

The improvement in performance between the invention and a prior system to the receiver hosts during an example file delivery process is shown in Tables 1 and 2. The tables relate to the transmission of a 10 Mbit file, where the file delivery transmission to receiver host 3a commences at 0 s. The second and third receiver hosts 3b, 3c join the file delivery transmission at 10 s and 20 s respectively.

The information in Tables 1 and 2 presumes that no packets are dropped in the transmission, i.e., the data for the time of file delivery completion td is the minimum time for the reception of the complete sequence of data packets A-G by a receiver host 3. The values of td are also approximate as they do not include small delays caused by sending the receiver hosts 3 start and end packets ST, END.

Table 1 illustrates an example where the system allocates a bandwidth of 100 kbit/s per user. As the same data packets are transmitted simultaneously to the receiver hosts 3a-3c, the available bandwidth is effectively shared between the receiver hosts 3a-3c. Therefore, as further receiver hosts 3a-3c ate included in the file delivery transmission, the data transfer rate experienced by each of the receiver hosts 3a-3c increases. For example, the first receiver host 3a receives data at 100 kbit/s over the time interval 0-10 s, i.e., until the second receiver host 3b joins the group. Data is then transferred to the receiver host 3a at 200 kbit/s during the time interval 10-20 s. When receiver host 3c joins the group, the data transfer rate increases again to 300 kbit/s.

TABLE 1

| User | Time of Request (s) | File Size (Mbit) | Transfer Rate (kbit/s) | Prior System $t_d$ (s) | Prior System PBW (kbit/s) | Present system $t_d$ (s) | Present system PBW (kbit/s) |
|---|---|---|---|---|---|---|---|
| 1 | 0 | 10 | 100 | 100 | 100 | 43 | 233 |
| 2 | 10 | 10 | 100 | 190 | 53 | 39 | 256 |
| 3 | 20 | 10 | 100 | 280 | 36 | 49 | 204 |

In this example, it has been presumed that the transmission to each receiver host 3a-3c stops when the complete file has been received, i.e., that the data transfer rate drops to 200 kbit/s at 43 seconds, as the receiver host 3a has left the group. If the server 7 is configured to continue transmitting data to receiver host 3a until each host in the group has received the complete sequence of data packets A-G, the data transfer rate and perceived bandwidth will remain at 300 kbit/s.

In the prior system, where further receiver hosts 3 cannot join an ongoing file delivery transmission, receiver hosts 3a, 3b and 3c would receive the file 100 s, 190 s and 280 s respectively, from the time that the file request from each receiver host 3 is submitted. The end users of the receiver hosts 3a-3c perceive bandwidths of 100 kbit/s, 53 kbit/s and 36 kbit/s respectively. In the present system, the time between submitting a request and completing the file delivery is 43 s, 39 s and 49 s respectively, so that the receiver hosts perceive bandwidths of 233 kbit/s, 256 kbit/s and 204 kbit/s.

Table 2 compares the file delivery times and bandwidths perceived by end-users of receiver hosts 3 for the prior queue-based system and a system according to the invention in which the total allocated bandwidth is constant.

TABLE 2

| User | Time of Request (s) | File Size (Mbit) | Transfer Rate (kbit/s) | Prior System $t_d$ (s) | Prior System PBW (kbit/s) | Present system $t_d$ (s) | Present system PBW (kbit/s) |
|---|---|---|---|---|---|---|---|
| 1 | 0 | 10 | 100 | 100 | 100 | 100 | 100 |
| 2 | 10 | 10 | 100 | 190 | 53 | 100 | 100 |
| 3 | 20 | 10 | 100 | 280 | 36 | 100 | 100 |

In this example, each of the receiver hosts 3a-3c receive the file in 100 s, without allowing for dropped packets and the extra start and end packets ST, END, sent during the first file delivery transmission. Each receiver host 3a-3c perceives the total available bandwidth of 100 kbit/s.

The invention has been described by way of an example and can be used for transferring data packets other than IP packets. While a point-to-multipoint transmission has been described, the invention may also be used for multipoint-to-multipoint data transfer. The receiver hosts 3a-3c may be fixed or mobile devices, e.g., mobile telephones or personal digital assistants (PDAs). It is not necessary for the receiver hosts 3a-3c to belong to the same local network or for the location of the hosts to be defined in terms of cell coverage.

Furthermore, it is not necessary for the server 7 to transmit data to the receiver hosts 3a-3c using a wireless communication system. The embodiment described relates to a system comprising a WAN, however, the invention is equally applicable to LAN networks or any other multicast enabled network and may be used for the transfer of files over networks other than the Internet or a DVB-T network, e.g., over DVB-S (satellite), DVB-C (cable), DVB-M, other DVB variants, Integrated Services Digital Broadcasting (ISDB), ATSC Digital Television or Digital Audio Broadcasting (DAB) networks or in multicast-enabled General Packet Radio Service (GPRS), Enhanced Data GSM Environment (EDGE), Universal Mobile Telecommunications Systems (UMTS), Wireless Code Division Multiple Access (W-CDMA), CDMA2000 or Bluetooth systems.

The cellular telecommunications network 13 is used merely as an alternative communication system to the wireless system 5. A different system, such as the Internet 4, could be used to convey requests and negative acknowledgements from the receiver hosts 3 to the server 7. If the wireless system 5 is bi-directional, the invention could be implemented using a single system to handle file delivery to the receiver hosts 3 and file requests.

In the embodiment described above, the location associated with the groups was defined in terms of the area covered by a DVB-T cell C1. However, the location may be defined differently, as required, for example in terms of the cells of the telecommunications network 13, depending on the requirements of the user or a service provider.

Furthermore, although the described embodiment comprised a server 7 located at the air interface, the invention may be implemented at any network element, e.g., a server, node or router, along the path between a content provider 2 and receiver hosts 3a-3c, while the receiver hosts may be fixed or mobile devices, including mobile personal digital assistants (PDAs).

The invention claimed is:

1. An apparatus comprising:
   a first logical interface configured to receive a file from a content provider;

a second logical interface configured to forward said file to one or more hosts as a sequence of data packets in a first file delivery transmission; and a processor configured to perform the following:
a) receive a first request for the file from a first host;
b) define a multicast delivery group including the first host;
c) receive a second request for the file from a second host during the first file delivery transmission of the requested file to the first host;
d) determine whether the second host is situated within a locational area of the first host;
e) if the second host is situated within the locational area of the first host, add the second host to the multicast delivery group, and cause the transmission of a remaining portion of the first file delivery transmission to both first and second hosts after adding the second host to the multicast delivery group; and
f) when a host is added to the group during the first file delivery transmission then, following completion of the sequence of data packets, cause re-transmission of said file to the group as a sequence of data packets in a second file delivery transmission,
wherein each host in the group is allocated an amount of bandwidth on a network on which the first file delivery transmission occurs, and the processor is further configured to:
share allocated bandwidth of multiple hosts in the group to increase a data transfer rate experienced by the hosts in the group.

2. An apparatus according to claim 1, further configured to transmit the file via a first communication network and to receive the requests from the hosts via a second communication network.

3. An apparatus according to claim 1, wherein the apparatus is further configured to transmit one or both of a request and the file between the apparatus and the second host via a cellular communications network, and the locational area is defined in terms of a cell, and the group is limited to hosts situated in a locational area covered by a single cell.

4. An apparatus according to claim 1, further configured to forward the file to the second host over a wireless communication network, being the last network element situated before an air-interface in a file delivery path between the content provider and the second host.

5. An apparatus according to claim 1, further comprising a file request handler configured to encrypt information in headers of the data packets relating to a correct order of data packets in the first file delivery transmission.

6. An apparatus according to claim 1, wherein said processor is further configured to log a point in the first file delivery transmission at which the second host is added to the group.

7. An apparatus according to claim 1, configured to receive a negative acknowledgement message and to treat said message as a request for the file.

8. The apparatus of claim 1, wherein said processor is further configured to:
after all hosts in the group have successfully received the file, maintain the group active for a predetermined amount of time; and
terminate the group after the predetermined amount of time if no additional host issues a request for the file.

9. A method comprising:
receiving a request for a file from a first host;
retrieving the file from a content provider;
defining a group comprising the first host;
forwarding the file to the group as a sequence of data packets in a first file delivery transmission;
receiving a request from a further host to join said group during said first file delivery transmission;
responding to said request by transmitting to said further host a start packet to configure a connection between a network element and said further host;
adding to the group any further hosts submitting requests for the file during said first file delivery transmission whereby said further hosts receive the remaining data packets in said first file delivery transmission, wherein adding a further host to the group includes comparing a location of the further host with a location of the first host, and wherein the file is forwarded via a first communication network and the request from the first host is received via a second communication network; and
where a host is added to the group during the first file delivery transmission then, following completion of the sequence of data packets, re-transmitting said file to the group as a sequence of data packets in a second file delivery transmission,
wherein each host in the group is allocated an amount of bandwidth on a network on which the first file delivery transmission occurs, and the method further comprises sharing allocated bandwidth of multiple hosts in the group to increase a data transfer rate experienced by the hosts in the group.

10. A method according to claim 9, wherein one or both of the request and the file is transmitted between the network element and the first host via a cellular communications network and the locational area is defined in terms of a cell, and the group is limited to hosts situated in an area covered by a single cell.

11. A method according to claim 9, further comprising encrypting information in headers of the data packets relating to a correct order of data packets in the first file delivery transmission.

12. A method according to claim 9, further comprising, where a further host has submitted a request during the first file delivery transmission, logging the point in the first file delivery transmission at which said further host joins the group.

13. A computer readable medium storing instructions that, when executed, cause a network element to perform the method of claim 9.

14. The method of claim 9, further comprising:
after all hosts in the group have successfully received the file, maintaining the group active for a predetermined amount of time; and
terminating the group after the predetermined amount of time if no additional host issues a request for the file.

15. A method comprising:
a host sending to a network element via a cellular telecommunication network a request to join a group;
receiving, via a different communication network from said cellular telecommunication network, a start packet transmitted by the network element which configures a connection between the network element and the host;
receiving a sequence of data packets transmitted by the network element in a first file delivery transmission;
arranging the sequence of data packets in their appropriate order; and
receiving a second file delivery transmission comprising the sequence of data packets;

wherein the host retrieves data packets that were dropped or missed in the first file delivery transmission by retrieving the corresponding data packets in the second file delivery transmission; and a data transfer rate experienced by the host increases as further hosts are included in the group through sharing of bandwidth allocated to the host and the further hosts on a network on which the first file delivery transmission occurs.

16. An apparatus comprising:

a transmitter configured to send a request to a network element to join a group of one or more hosts to receive a file transmitted by said network element;

a receiver configured to receive a start packet transmitted by the network element to configure a connection between the network element and the receiver and to receive a sequence of data packets transmitted by the network element to the group in a first file delivery transmission and re-transmitted by the network element to the group in a second file delivery transmission; and a processor configured to arrange the sequence of data packets in their appropriate order;

wherein the apparatus is arranged to retrieve any data packets that were dropped or missed in the first file delivery transmission by retrieving the corresponding data packets in the second file delivery transmission; and the apparatus is configured to experience a data transfer rate that increases as further apparatuses are included in the group through sharing of bandwidth on a network on which the first file delivery transmission occurs allocated to the apparatus and the further apparatuses.

17. An apparatus according to claim 16, configured to receive said data packets via a first communication network and to transmit the request via a second communication network.

18. An apparatus according to claim 16, comprising a mobile telephone.

* * * * *